United States Patent [19]
Matsuoka et al.

[11] Patent Number: 5,835,872
[45] Date of Patent: Nov. 10, 1998

[54] ELECTRIC POWER STEERING APPARATUS

[75] Inventors: Hirofumi Matsuoka, Kyoto; Yasuji Noritou; Ken Fukuda, both of Kashiwara, all of Japan

[73] Assignee: Koyo Seiko Co., Ltd., Osaka, Japan

[21] Appl. No.: 711,723

[22] Filed: Sep. 4, 1996

[30] Foreign Application Priority Data

Sep. 8, 1995 [JP] Japan .................................. 7-231672

[51] Int. Cl.$^6$ ...................................................... B62D 5/04
[52] U.S. Cl. ............................ 701/41; 701/42; 180/422; 180/446
[58] Field of Search ....................... 701/41, 42; 180/443, 180/446, 412, 415, 422

[56] References Cited

U.S. PATENT DOCUMENTS

| | | | |
|---|---|---|---|
| 4,664,211 | 5/1987 | Oshita et al. | 180/446 |
| 5,355,315 | 10/1994 | Daido et al. | 701/41 |
| 5,404,960 | 4/1995 | Wada et al. | 180/446 |
| 5,469,357 | 11/1995 | Nishimoto | 180/446 |
| 5,473,539 | 12/1995 | Shimizu et al. | 180/446 |
| 5,631,529 | 5/1997 | Shimizu et al. | 180/446 |
| 5,659,473 | 8/1997 | Noro et al. | 701/42 |
| 5,698,956 | 12/1997 | Nishino et al. | 180/443 |
| 5,752,209 | 5/1998 | Nishimoto et al. | 701/42 |

FOREIGN PATENT DOCUMENTS 460 406  12/1991  European Pat. Off. .

*Primary Examiner*—Gary Chin
*Attorney, Agent, or Firm*—Darby & Darby

[57] ABSTRACT

An electric power steering apparatus comprising a broken-line function circuit for outputting a predetermined analog broken-line function signal on the basis of a torque detection signal, a gain circuit for giving a predetermined gain to the broken-line function signal, a polarity inverting circuit for inverting the polarity of the broken-line function signal, a first attenuating means for attenuating the torque detection signal at a predetermined rate, a second attenuating means for attenuating an output signal of said polarity inverting circuit at a predetermined rate, an addition circuit for adding a signal from the first attenuating, a signal from the second attenuating means and an output signal of the gain circuit, and outputting the addition value as a target value of a motor current, and a differential amplifying circuit for calculating a difference between the target value and the motor current detected by a detecting circuit for the purpose of feedback control, wherein a steering force assisting motor is driven on the basis of an output signal from the differential amplifying circuit.

8 Claims, 7 Drawing Sheets

ELECTRIC POWER STEERING APPARATUS

BACKGROUND OF THE INVENTION

1. Field of the Invention

The invention relates to an improvement of an electric power steering apparatus.

2. Description of Related Art

In a conventional electric power steering apparatus, a steering force assisting motor is controlled to be driven on the basis of a current target value of the steering force assisting motor which is determined on the basis of a steering torque, and a driving current of the steering force assisting motor. A control unit in which quick response performance is required is constructed by a microcomputer.

In this conventional electric power steering apparatus, characteristics of the current target value of the steering force assisting motor to the steering torque are stored in a ROM in the structure of a data table, and the microcomputer calculates the current target value of the steering force assisting motor. Also, the microcomputer performs a process to obtain a difference of a value of the actually flowing current from the current target value of the steering force assisting motor for the purpose of feedback control.

When the above-mentioned process is conducted with poor responsivity one feels unsatisfied at the steering. Hence, the microcomputer used is expensive to meet the necessity for high performance (high speed) in order to be resistive for use in processes required to be responded quickly. This increases production costs.

A limiter circuit employing an analog circuit is used to prevent the current from flowing too much for the purpose of protecting the steering force assisting motor. A limit value of the current is fixed, and cannot be changed in accordance with running conditions of a vehicle such as a vehicle speed or a state when the vehicle stops.

SUMMARY OF THE INVENTION

The invention has been devised in order to solve the above-mentioned problems. It is an object of the invention to provide an electric power steering apparatus which can furthermore improve the feeling a smoothness at the steerage while reducing production costs.

An electric power steering apparatus according to the invention comprises a broken-line function circuit for outputting a predetermined analog broken-line function signal on the basis of a torque detection signal from a torque sensor for detecting a steering torque, a gain circuit for supplying a predetermined gain to the broken-line function signal, a polarity inverting circuit for inverting the polarity of the broken-line function signal, a first attenuating means for attenuating the torque detection signal at a predetermined rate, a second attenuating means for attenuating an output signal from the polarity inverting circuit at a predetermined rate, an addition circuit for adding a signal from the first attenuating means, an output signal of the gain circuit and an output signal of the second attenuating means and outputting the addition value as a target value of a motor current, a differential amplifying circuit for obtaining a difference between the motor current outputted from a circuit detecting the motor current and the target value for the purpose of feedback control, wherein a steering force assisting motor is driven on the basis of an output signal from the differential amplifying circuit.

The broken-line function signal outputted from the broken-line function circuit is a main factor for synthesizing predetermined characteristics between the steering torque and the current target value of the steering force assisting motor. The signal obtained and outputted from the polarity inverting circuit by inverting the polarity of the broken-line function signal is a factor for changing the inclination of the above-mentioned broken-line function signal which is given the predetermined gain.

Figure 1:
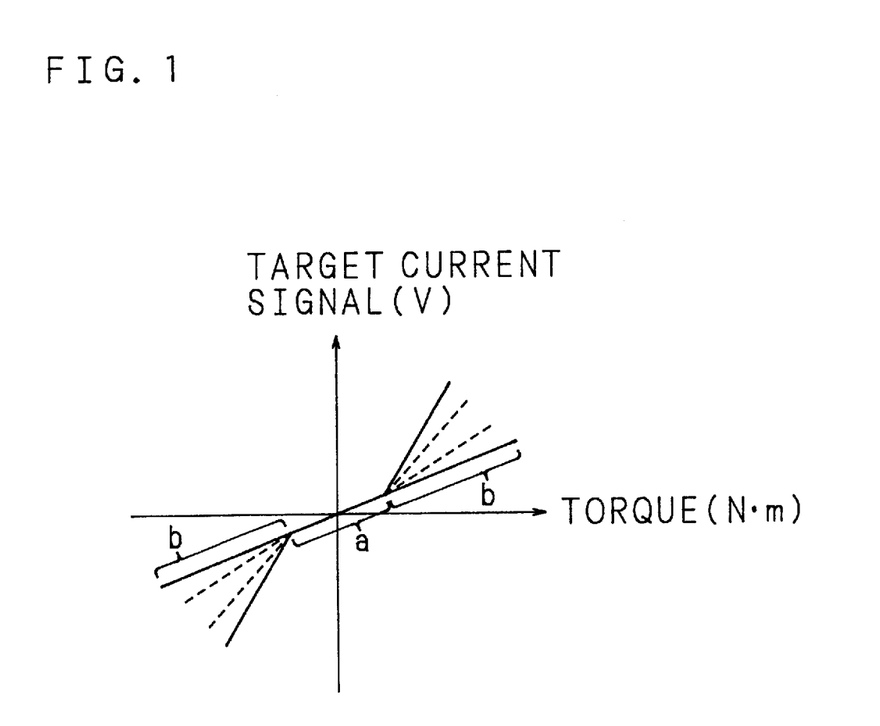
FIG. 1 is a characteristic diagram of a steering torque and a current target value of a steering force assisting motor.

The addition circuit outputs the addition value as the motor current target value based on the characteristics between the steering torque and the current target value of the steering force assisting motor shown in FIG. 1. Here, the signal outputted by the first attenuating means is a factor for giving the inclination of an a region where the steering torque is nearly 0 in the predetermined characteristics between the steering torque and the current target value of the steering force assisting motor.

Consequently, in the electric power steering apparatus, a quick response is obtained. Also, the steering smoothness is improved and the resolution of the torque detection signal is enhanced thereby decreasing control noises. Further, an inexpensive microcomputer is utilizable thereby to decrease production costs.

In the prior art, the lowest gain of a "b" region where the steering torque is large in both clockwise and counter-clockwise directions is equal to the gain of the "a" region where the steering torque is nearly 0 in the characteristics between the steering torque and the current target value of the steering force assisting motor, so that the characteristics obtained are in a narrow range. However, providing the polarity inverting circuit for calculating the target value allows the gain of the "b" region to be changed freely, whereby the characteristics range obtained is extended. Accordingly, the electric power steering apparatus is more widely applicable to kinds of vehicles.

Also, the electric power steering apparatus further comprises a differential circuit for differentiating the torque detection signal and outputting the result to the polarity inverting circuit, wherein the addition circuit attenuates the output signal of the polarity inverting circuit at a predetermined rate, adds the attenuated signal, the output signal of the attenuating means and the output signal of the gain circuit, and outputs the addition value as the target value.

In the electric power steering apparatus, phase compensation is performed by using the signal differentiated by the differential circuit for calculation of the target value. This improves response delay and makes inertial control for negating a weight load of the motor stable to suppress vibrations of a steering wheel.

The electric power steering apparatus further comprises a gain determining means for determining the gain on the basis of the running condition of the vehicle, wherein the gain circuit supplies the gain determined by the gain determining means to the broken-line function signal.

In this electric power steering apparatus, the gain determining means in the microcomputer determines the gain on the basis of the running condition of the vehicle such as running vehicle speed or stopping state, etc. Moreover, the process which has been handled by the microcomputer in the prior art is performed by the gain circuit of an analog circuit. This can lighten the burden of the microcomputer. When the resistance ratio of divided resistances for determining the gain in the gain circuit is 1:2:4:8, for example, a vehicle-speed characteristic (gain) of the electric power steering apparatus can be realized with an equal width.

Also, it is another object of the invention to provide an electric power steering apparatus in which a limit value of a limiter circuit can be changed in correspondence with the running condition of a vehicle.

In an electric power steering apparatus of the invention, upper/lower limit values which have been fixed values in the prior art are determined on the basis of the running condition of the vehicle such as running speed and stopping state, etc. by an upper/lower limit value determining means in a microcomputer, and a limiter circuit limits a motor current target value by the upper/lower limit values. In this way, the limit value of the limiter circuit which has been fixed in the prior art can be changed.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiments.

Figure 2:
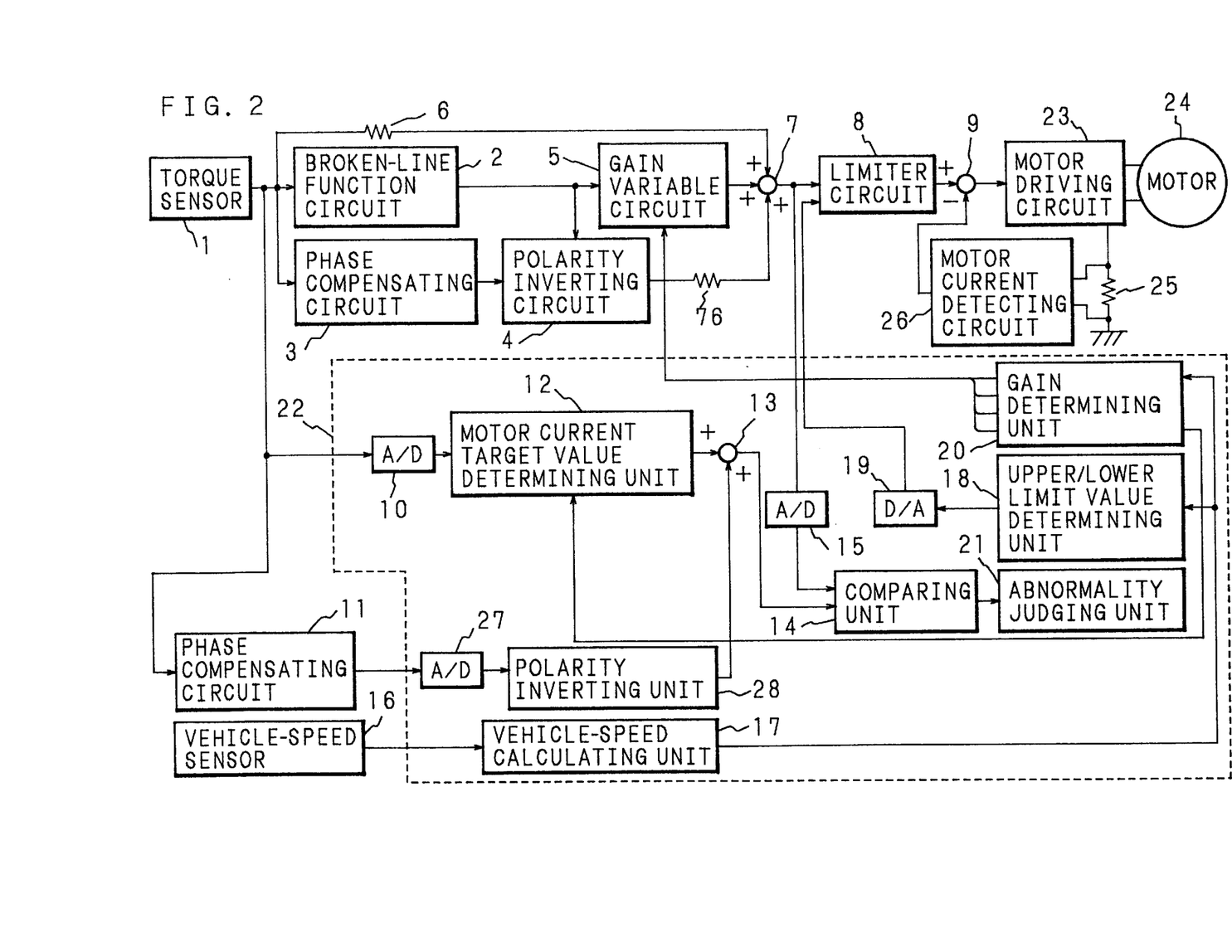
FIG. 2 is a schematic block diagram showing a structure of an electric power steering apparatus of the invention.

FIG. 2 is a schematic block diagram showing an example of the structure of an electric power steering apparatus of the invention. In this electric power steering apparatus, a torque detection signal outputted from a torque sensor 1 for detecting a steering torque disposed at a steering shaft is inputted to a broken-line function circuit 2, a phase compensating circuit (differential circuit) 3, a microcomputer 22, and a phase compensating circuit (differential circuit) 11 and inputted also to an addition circuit 7 via a resistance (first attenuating means) 6.

A broken-line function signal outputted from the broken-line function circuit 2 is supplied to a gain variable circuit (gain circuit) 5 and a polarity inverting circuit 4, and to the polarity inverting circuit 4 is also supplied a differentiated signal of the torque detection signal outputted from the phase compensating circuit 3.

Further, the torque detection signal is differentiated and inverted in polarity by the phase compensating circuit 3, then inverted again in polarity by the polarity inverting circuit 4, to be returned to the original polarity. The gain variable circuit 5 sets a gain on the basis of an instruction from a gain determining unit 20 of the microcomputer 22, amplifies the broken-line function signal in accordance with the gain, and outputs the obtained signal to the addition circuit 7.

The polarity inverting circuit 4 adds the broken-line function signal and the differentiated signal of the torque detection signal, inverts the added signal in polarity, and supplies the obtained signal to a resistance (second attenuating means) 76. The resistance 76 attenuates an output signal from the polarity inverting circuit 4 at a predetermined rate and supplies the attenuated signal to the addition circuit 7. The addition circuit 7 adds the signal attenuated by the resistance 76, the torque detection signal attenuated at a predetermined rate by the resistance 6 and an output signal of the gain variable circuit 5, and outputs the obtained signal to a limiter circuit 8 as a current target value for a steering force assisting motor 24. The limiter circuit 8 sets upper/lower limit values of the current target value of the motor 24, limits the current target value of the motor 24 by the upper/lower limit values, and outputs the value to a differential amplifying circuit 9.

The differential amplifying circuit 9 outputs a signal corresponding to a difference of a motor current value detected by a motor current detecting circuit 26 from the current target value of the motor 24 to a motor driving circuit 23. The motor driving circuit 23 drives the motor 24 with PWM (pulse wave modulation) according to the signal from the differential amplifying circuit 9. The motor current detecting circuit 26 detects the motor current from a both ends voltage of a resistance 25 connected between the motor driving circuit 23 and a ground terminal and outputs the motor current detection signal to the differential amplifying circuit 9.

Still further, the torque detection signal from the torque sensor 1 inputted to the microcomputer 22 is converted to a digital signal by an A/D converter 10 and then given to a motor current target value determining unit 12. The motor current target value determining unit 12 determines the motor current target value on the basis of a data table storing characteristics between steering torques and motor current target values for every gain and an instruction value from the gain determining unit 20, and supplies the value to an addition unit 13.

Moreover, the torque detection signal from the torque sensor 1 is differentiated and inverted in polarity by the phase compensating circuit 11, and then converted to a digital signal by an A/D converter 27. After that, the digital signal is inverted in polarity by a polarity inverting unit 28 and supplied to the addition unit 13. The addition unit 13 adds the signal from the motor current target value determining unit 12 to the signal from the polarity inverting unit 28 and outputs the result to a comparing unit 14. When the current target value of the motor 24 converted to a digital signal by an A/D converter 15 is supplied from the addition circuit 7 to the comparing unit 14, the comparing unit 14 compares the current target value with the current target value from the addition unit 13 and supplies the result of comparison to an abnormality judging unit 21. The abnormality judging unit 21 judges the presence or absence of abnormality from the result. When the abnormality judging unit 21 judges that there is an abnormality, a diagnosis indication lamp is switched on.

A vehicle-speed signal is given from a vehicle-speed sensor 16 to the microcomputer 22. The vehicle-speed is converted to a digital signal by a vehicle-speed calculation unit 17 and then supplied to the gain determining unit 20 and an upper/lower limit value determining unit 18. The gain determining unit 20 determines a gain of the gain variable circuit 5 and a characteristic of the motor current target value determining unit 12 based on the vehicle-speed signal, and the determined gain of a 4-bit digital signal is fed to the gain variable circuit 5 and the motor current target value determining unit 12. The upper/lower limit value determining unit 18 determines upper/lower limit values of the limiter circuit 8, and instructs to the limiter circuit 8 the determined upper/lower limit values via a D/A converter 19.

Hereinafter, the operation of the electric power steering apparatus having the above-mentioned configuration will be described.

Figure 3A:
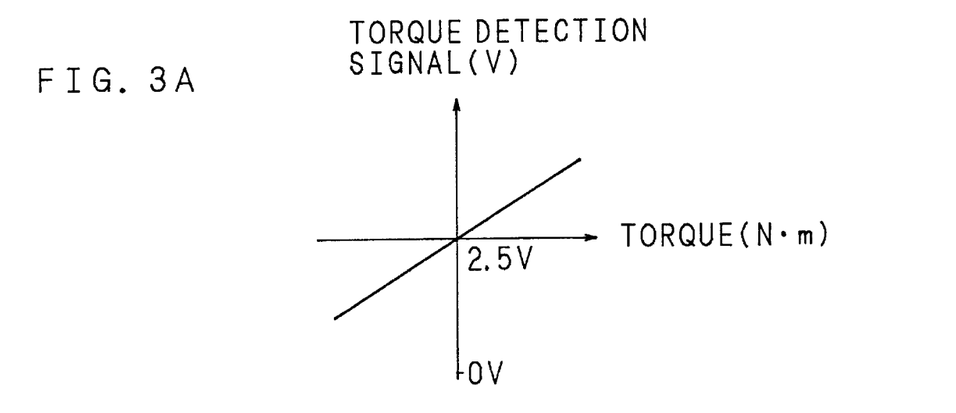
FIG. 3A is a characteristic diagram of a torque detection signal.

The torque detection signal from the torque sensor 1 as shown in FIG. 3A is supplied to the broken-line function circuit 2, the phase compensating circuit 3, the microcomputer 22 and the phase compensating circuit 11, and supplied to the addition circuit 7 via the resistance 6.

Figure 3B:
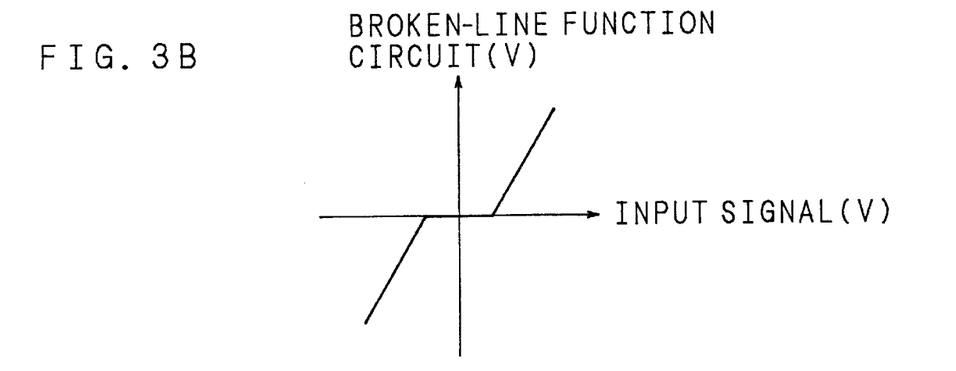
FIG. 3B is a characteristic diagram of an output signal of a broken-line function circuit.
Figure 3C:
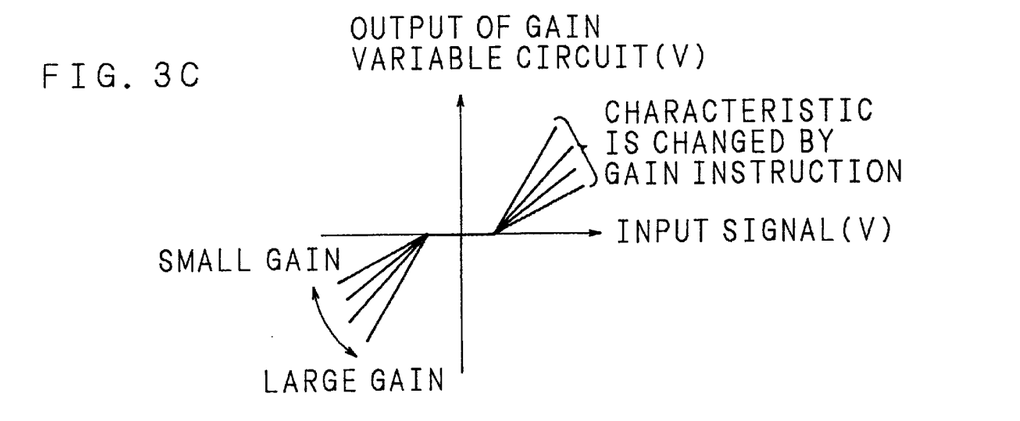
FIG. 3C is a characteristic diagram of an output signal of a gain variable circuit.

The broken-line function signal outputted from the broken-line function circuit 2 has a characteristic in the shape of a broken-line as shown in FIG. 3B, and it is applied to the gain variable circuit 5 and the polarity inverting circuit 4. To the polarity inverting circuit 4 is supplied the differentiated signal of the torque detection signal outputted from the phase compensating circuit 3. The gain variable circuit 5 sets the gain on the basis of the instruction of the gain determining unit 20, amplifies the broken-line function signal with the gain, and outputs the result to the addition circuit 7. The output signal of the gain variable circuit 5 can be changed in characteristic by varying the gain, as shown in FIG. 3C.

Figure 4A:
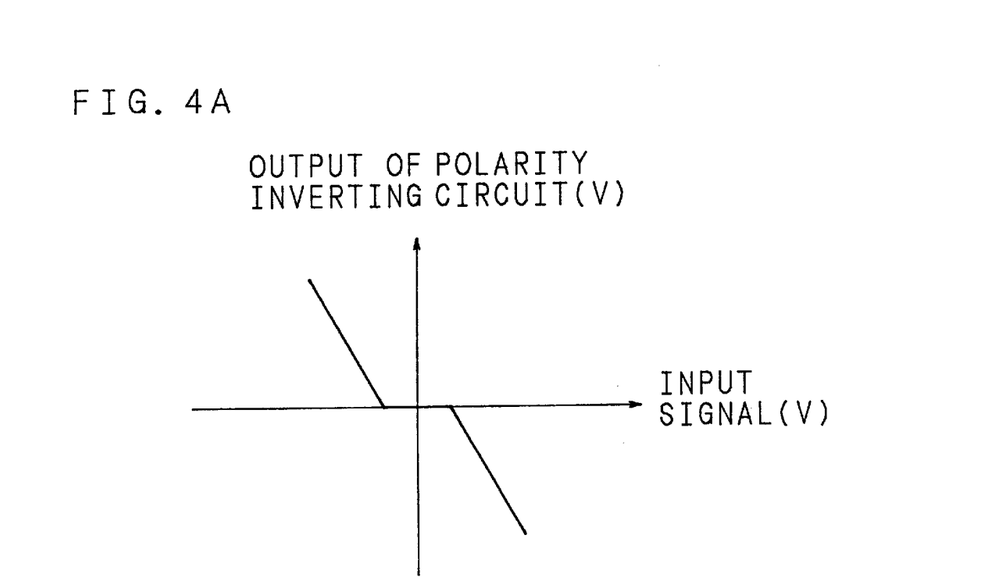
FIG. 4A is a characteristic diagram of an output signal of a polarity inverting circuit.
Figure 4B:
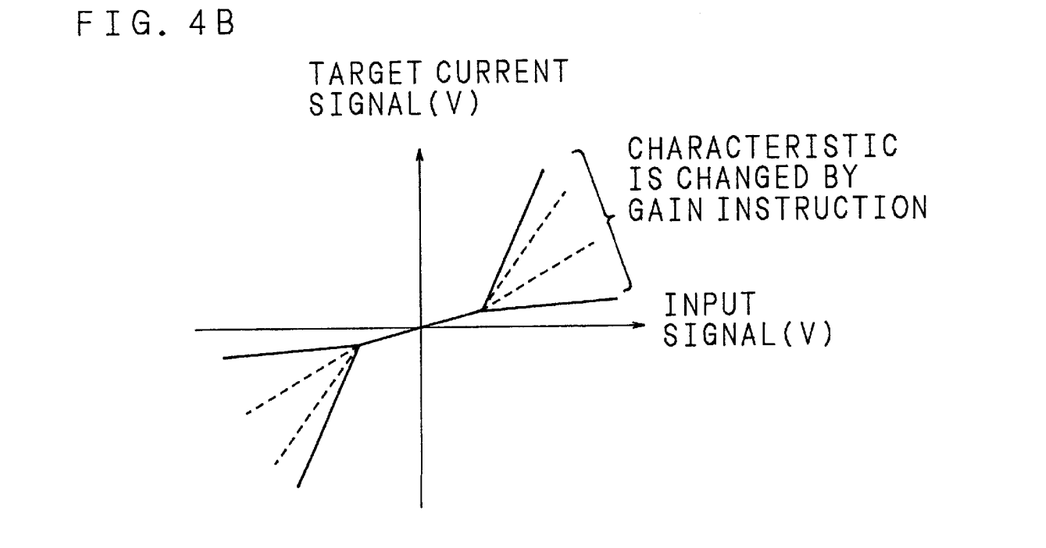
FIG. 4B is a characteristic diagram of a motor target current signal.

The polarity inverting circuit 4 adds the broken-line function signal to the differentiated signal of the torque detection signal, inverts the added signal in polarity, and supplies the obtained polarity inverted signal as shown in FIG. 4A to the resistance 76. The resistance 76 attenuates the output signal of the polarity inverting circuit 4 at the predetermined rate and supplies the attenuated signal to the addition circuit 7. The addition circuit 7 adds the signal attenuated by the resistance 76, the torque detection signal attenuated at the predetermined rate by the resistance 6 and the output signal of the gain variable circuit 5, and outputs the added signal shown in FIG. 4B as the current target value of the motor 24. In the characteristic of the current target value shown in FIG. 4B, the inclination of a center region is determined by the value of the resistance 6. Since the attenuated signal of the output signal from the polarity inverting circuit 4 is added, the characteristic can be changed more freely.

The current target value of the motor 24 outputted from the addition circuit 7 is inputted to the limiter circuit 8. The limiter circuit 8 sets the upper/lower limit values of the current target value of the motor 24 on the basis of the instruction from the upper/lower limit value determining unit 18, limits the current target value of the motor 24 by the upper/lower limit values, and outputs the value to the differential amplifying circuit 9. The upper/lower limit values have the same width via a predetermined reference voltage as a center value.

The differential amplifying circuit 9 outputs the signal corresponding to the difference between the current target value of the motor 24 and the motor current from the motor current detecting circuit 26 to the motor driving circuit 23. The motor driving circuit 23 drives the motor 24 with PWM in accordance with the signal from the differential amplifying circuit 9. The motor current detecting circuit 26 detects the motor current from the both ends voltage of the resistance 25 to which the same current as that in the motor 24 flows, and outputs the detection signal of the motor current to the differential amplifying circuit 9.

Since the operation of the microcomputer 22 is the same as the operation described in the above-mentioned arrangement, the description thereof will be omitted.

Figure 5:
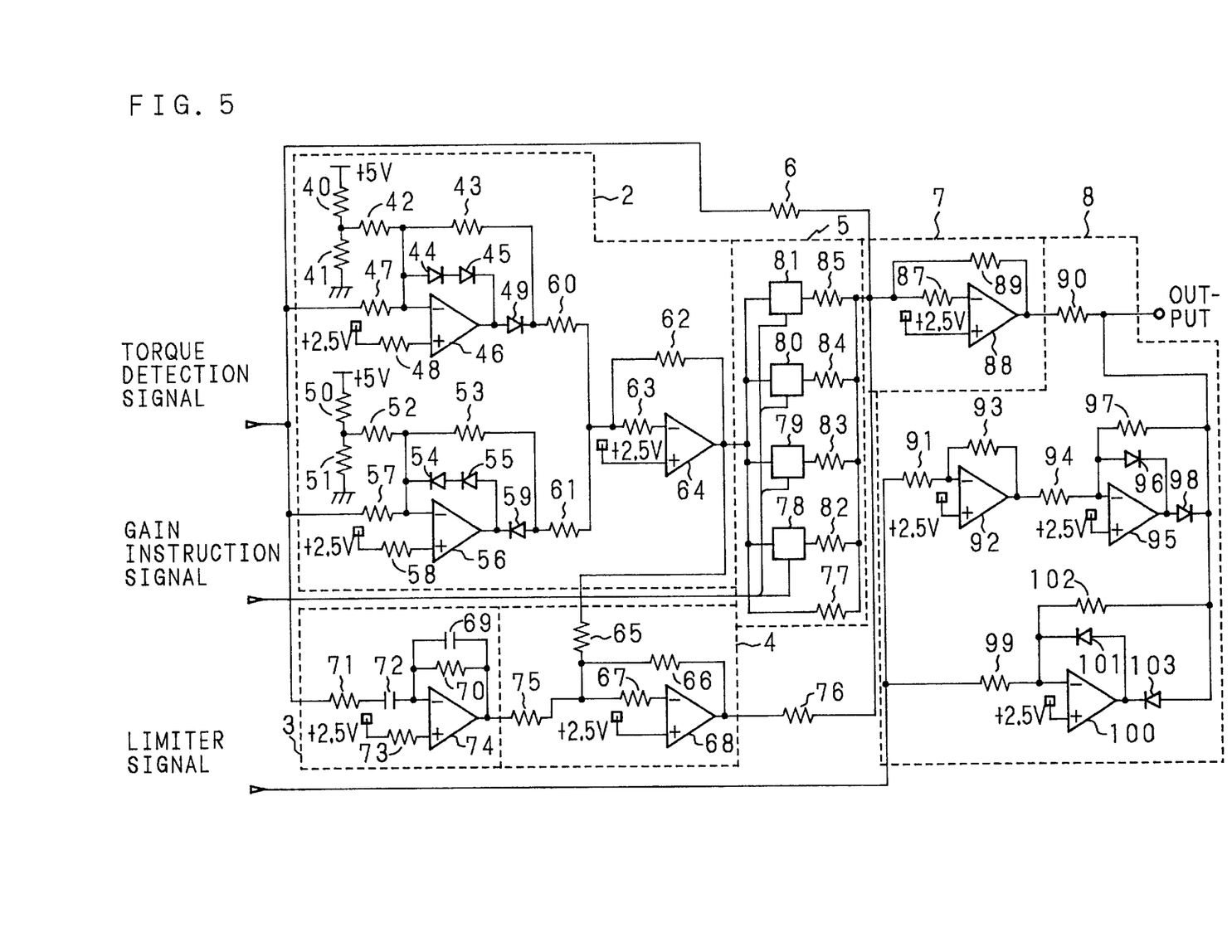
FIG. 5 is a circuit diagram showing an example of the broken-line function circuit, a phase compensating circuit, the polarity inverting circuit, the gain variable circuit, an addition circuit and a limiter circuit.

FIG. 5 is a circuit diagram showing an example of the broken-line function circuit 2, the phase compensating circuit 3, the polarity inverting circuit 4, the gain variable circuit 5, the addition circuit 7 and the limiter circuit 8.

In the broken-line function circuit 2, the torque detection signal from the torque sensor 1 is inputted to inverting input terminals of OP-amps 46 and 56 via resistances 47 and 57.

A constant voltage of 2.5 V is applied to a non-inverting input terminal of the OP-amp 46 via a resistance 48, and an output terminal of the OP-amp 46 is connected to an anode of a diode 49. A cathode of the diode 49 is connected to an inverting input terminal of the OP-amp 46 via a resistance 43. The resistances 47 and 43 are set to have the same value. An anode of a diode 44 is connected to the inverting input terminal of the OP-amp 46. The diode 44 is forward-connected to a diode 45 whose cathode is connected to the output terminal of the OP-amp 46. A divided voltage of a voltage dividing circuit of a constant voltage of 5 V comprising resistances 40 and 41 is applied to the inverting input terminal via a resistance 42.

A constant voltage of 2.5 V is applied to a non-inverting input terminal of the OP-amp 56 via a resistance 58, and an output terminal of the OP-amp 56 is connected to a cathode of a diode 59 whose anode is connected to an inverting input terminal of the OP-amp 56 via a resistance 53. The resistances 57 and 53 are set to have the same value. A cathode of a diode 54 is connected to the inverting input terminal of the OP-amp 56. The diode 54 is forward-connected to a diode 55 whose anode is connected to the output terminal of the OP-amp 56. A divided voltage of a voltage dividing circuit of a constant voltage of 5 V comprising resistances 50 and 51 is applied to the inverting input terminal via a resistance 52.

The two circuits essentially comprising the above-mentioned OP-amps 46 and 56 are ideal diodes having opposite characteristics each other, wherein negative feedback voltages are respectively adjusted by the voltage dividing circuits (40 and 41/50 and 51) and bias voltages of 2.5 V are applied.

Outputs of these ideal diodes are added via resistances 60 and 61 and inputted to an inverting input terminal of an OP-amp 64 via a resistance 63.

A constant voltage of 2.5 V is applied to a non-inverting input terminal of the OP-amp 64, and an output terminal of the OP-amp 64 is connected to the inverting input terminal thereof via a resistance 62 and the resistance 63. The circuit essentially constituted of the OP-amp 64 is an inverting amplifying circuit having an inversion voltage of 2.5 V.

In the broken-line function circuit 2, in the case where the divided voltages of the voltage dividing circuits (40 and 41/50 and 51) are respectively 2.8 V and 2.2 V, the OP-amp 46 outputs a negative voltage when the torque detection signal is 2.2 to 2.8 V, because the voltage of the inverting input terminal of the OP-amp 46 shows a predominant tendency to be increased to be higher than the voltage of 2.5 V due to the virtual short by the divided voltage of 2.8 V. In this case, the OP-amp 56 outputs a positive voltage because the voltage of the inverting input terminal of the OP-amp 56 is predominantly apt to be decreased to be lower than the voltage of 2.5 V due to the virtual short by the divided voltage of 2.2 V. As a result, the OP-amps 46 and 56 of ideal diodes output 2.5 V.

The OP-amp 46 outputs a positive voltage when the torque detection signal is lower than 2.2 V, because the inverting input terminal of the OP-amp 46 predominantly tends to be decreased to a lower voltage than the voltage of 2.5 V. As a result, the OP-amp 46 of the ideal diode outputs a higher voltage as the torque detection signal becomes decreased. The OP-amp 56 outputs a negative voltage when the torque detection signal is higher than 2.8 V, because the inverting input terminal of the OP-amp 56 is predominantly inclined to be raised to a higher voltage than the voltage of 2.5 V. As a result, the OP-amp 56 of the ideal diode outputs a lower voltage in accordance with the increase of the torque detection signal.

The inverting amplifying circuit including the OP-amp 64 inverts output signals of the OP-amps 46 and 56 of the above-mentioned ideal diodes in polarity with the inversion voltage of 2.5 V. Hence, the broken-line function circuit 2 has a non-sensible range (2.2 to 2.8 V) determined by the divided voltage of the voltage dividing circuits (40 and 41/50 and 51) centering 2.5 V as shown in FIG. 3B and an input-output characteristic of a polygonal line shape showing a 180° rotation symmetry.

In the phase compensating circuit 3, the torque detection signal from the torque sensor 1 is inputted to an inverting input terminal of an OP-amp 74 via a resistance 71 and a capacitor 72. A constant voltage of 2.5 V is applied to a non-inverting input terminal of the OP-amp 74 via a resistance 73, and the OP-amp 74 is negatively fed-back via a parallel circuit comprising a resistance 70 and a capacitor 69. The phase compensating circuit 3 is a differential circuit for inverting the polarity of the torque detection signal from the torque sensor 1, differentiating the result and outputting the differentiated signal to the polarity inverting circuit 4 via a resistance 75.

In the polarity inverting circuit 4, the differentiated signal of the torque detection signal from the phase compensating circuit 3 and the output signal of the broken-line function circuit 2 inputted via a resistance 65 are added, and the result is inputted to an inverting input terminal of an OP-amp 68 via a resistance 67. A constant voltage of 2.5 V is applied to a non-inverting input terminal of the OP-amp 68, and the OP-amp 68 is negatively fed-back via a resistance 66 and the resistance 67. The polarity inverting circuit 4 is an inverting amplifying circuit with an inversion voltage of 2.5 V, which adds the differentiated signal of the torque detection signal and the output signal of the broken-line function circuit 2, inverts the polarity of the added signal, and outputs the result to the addition circuit 7 via the resistance 76.

In the gain variable circuit 5, the output of the broken-line function circuit 2 is inputted to an analog switching circuit in which four series circuits comprising switching circuits 78, 79, 80 and 81 and resistances 82, 83, 84 and 85 respectively and a resistance 77 are connected in parallel. An output of the analog switching circuit is inputted to an inverting input terminal of an OP-amp 88 via a resistance 87 in the addition circuit 7. The switching circuits 78, 79, 80, and 81 are opened/closed on the basis of the gain instruction signal from the gain determining unit 20 in the microcomputer 22, thereby setting the gain.

In the gain variable circuit 5, when the ratio of the resistances 82, 83, 84 and 85 are set to be 1:2:4:8, the vehicle-speed characteristic (gain) of the apparatus can be realized with an equal width.

A constant voltage of 2.5 V is applied to a non-inverting input terminal of the OP-amp 88 and the OP-amp 88 is negatively fed-back via a resistance 89 and the resistance 87. The circuit essentially consisting of the OP-amp 88 is an inverting amplifying circuit with an inversion voltage of 2.5 V.

The inverting amplifying circuit adds the torque detection signal attenuated at the predetermined rate by the resistance 6, the output signal of the gain variable circuit 5 and the output signal of the polarity inverting circuit 4 attenuated at the predetermined rate by the resistance 76, inverts and amplifies the added signal, then outputs the result as the target current value of the motor 24.

In the limiter circuit 8, the limiter signal from the upper/lower limit value determining unit 18 in the microcomputer 22 is inputted to inverting input terminals of OP-amps 92 and 100 via resistances 91 and 99.

A constant voltage of 2.5 V is applied to a non-inverting input terminal of the OP-amp 92 and the OP-amp 92 is negatively fed-back via a resistance 93. The circuit essentially constituted of the OP-amp 92 is an inverting amplifying circuit with an inversion voltage of 2.5 V. An output of the inverting amplifying circuit is inputted to an inverting input terminal of the OP-amp 95 via a resistance 94.

In the OP-amp 100, a constant voltage of 2.5 V is applied to a non-inverting input terminal thereof, and an output terminal thereof is connected to a cathode of a diode 103. An anode of the diode 103 is connected to the inverting input terminal of the OP-amp 100 via a resistance 102. The inverting input terminal is connected to a cathode of a diode 101, and the output terminal of the OP-amp 100 is connected to an anode of the diode 101.

To a non-inverting input terminal of an OP-amp 95 is applied a constant voltage of 2.5 V, and an output terminal thereof is connected to an anode of a diode 98. A cathode of the diode 98 is inputted to the inverting input terminal of the OP-amp 95 via a resistance 97. The inverting input terminal is connected to an anode of a diode 96, and the output terminal of the OP-amp 95 is connected to a cathode of the diode 96.

The circuits essentially comprising the OP-amps 100 and 95 are ideal diodes having opposite characteristics each other to which bias voltages of 2.5 V are applied.

The cathode of the diode 98 and the anode of the diode 103 are connected to an output terminal of the OP-amp 88 via a resistance 90. A common connecting point of the cathode of the diode 98, the anode of the diode 103 and the resistance 90 is an output terminal of the limiter circuit.

The ratio of the resistance 94 and the sum of the resistances 97 and 90 is set to be 2:1. The ratio of the resistance 99 and the sum of the resistances 102 and 90 is set to be 2:1.

In the limiter circuit 8, the OP-amp 92 outputs 5.5 V when the limiter signal from the upper/lower limit value determining unit 18 in the microcomputer 22 is, for example, −0.5 V and the values of the resistances 91 and 93 are equal to each other. At this time, the ideal diodes essentially comprising the OP-amps 95 and 100 receive input voltages of 5.5 V and −0.5 V respectively.

In this state of setting, when the output voltage of the OP-amp 88 is 1 to 4 V, the OP-amp 95 outputs a negative voltage since the inverting input terminal of the OP-amp 95 is predominantly inclined to be raised to a higher voltage than the voltage of 2.5 V due to the virtual short by the input voltage of 5.5 V. As a result, the diode 96 is turned on and the diode 98 is turned off.

In this case, the OP-amp 100 outputs a positive voltage since the inverting input terminal of the OP-amp 100 is predominantly inclined to be decreased to a lower voltage than the voltage of 2.5 V due to the virtual short by the input voltage of –0.5 V. As a result, the diode 101 is turned on and the diode 103 is turned off.

Consequently, the OP-amps 95 and 100 of the ideal diodes give no influences on the output voltage of the limiter circuit 8 by the voltage drop of the resistances 97 and 102. The output voltage of the limiter circuit 8 is equal to the output voltage of the OP-amp 88 influenced by the voltage drop of the resistance 90.

When the output voltage of the OP-amp 88 is lower than 1 V, the OP-amp 95 outputs a positive voltage since the inverting input terminal of the OP-amp 95 is predominantly inclined to be decreased to a lower voltage than the voltage of 2.5 V due to the virtual short. As a result, the diode 96 is turned off and the diode 98 is turned on.

In this way, the output voltage of the OP-amp 95 of the ideal diode is kept at about 1 V, whereby the output voltage of the limiter circuit 8 is also kept at about 1 V.

Here, the OP-amp 100 outputs a positive voltage since the inverting input terminal of the OP-amp 100 is predominantly inclined to be decreased to a lower voltage than the voltage of 2.5 V due to the virtual short. As a result, the diode 101 is turned on and the diode 103 is turned off. The OP-amp 100 constituting the ideal diode gives no influence on the output voltage of the limiter circuit 8 because of the voltage drop of the resistance 102.

When the output voltage of the OP-amp 88 is higher than 4 V, the OP-amp 100 outputs a negative voltage since the inverting input terminal of the OP-amp 100 is predominantly inclined to be raised to a higher voltage than the voltage of 2.5 V due to the virtual short. As a result, the diode 101 is turned off and the diode 103 is turned on. Consequently, the output voltage of the OP-amp 100 of the ideal diode is kept at about 4 V, and the output voltage of the limiter circuit 8 is also kept at about 4 V.

Here, the OP-amp 95 outputs a negative voltage since the inverting input terminal of the OP-amp 95 is predominantly inclined to be raised to a higher voltage than the voltage of 2.5 V due to the virtual short. As a result, the diode 96 is turned on and the diode 98 is turned off. The OP-amp 95 of the ideal diode exerts no influence on the output voltage of the limiter circuit 8 because of the voltage drop of the resistance 97.

Consequently, the limiter circuit 8 can set the upper/lower limit values spaced an equal width from 2.5 V.

Figure 6:
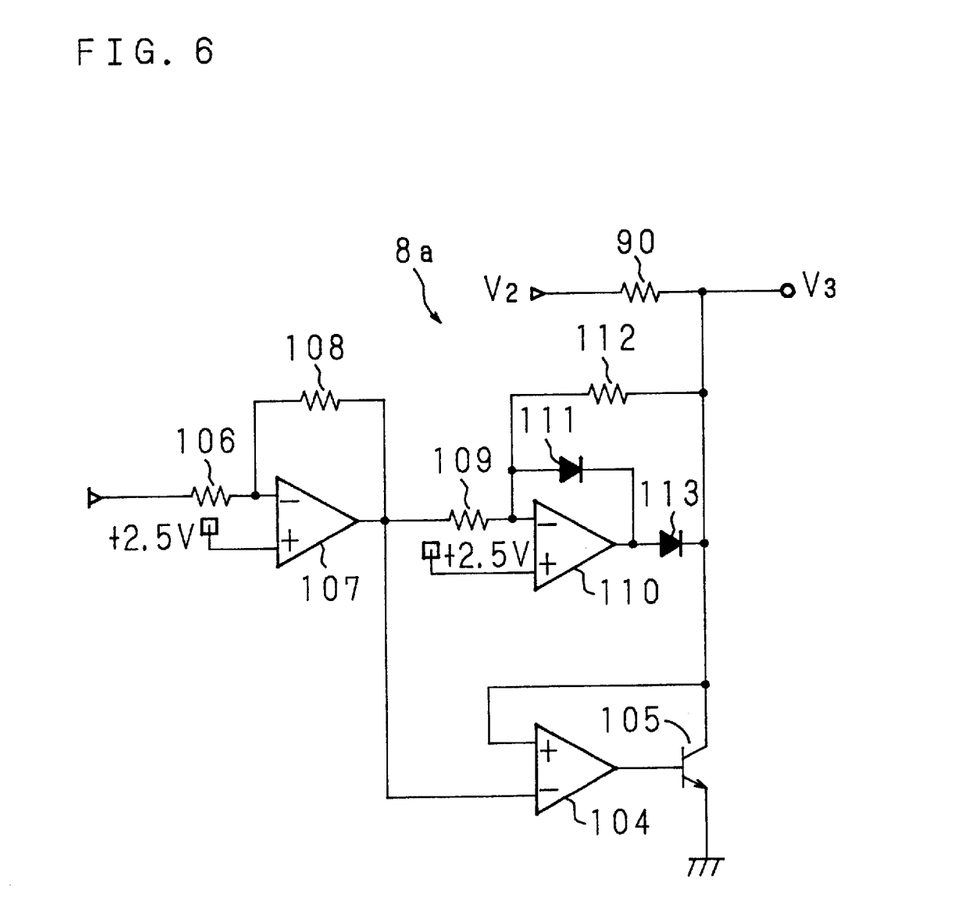
FIG. 6 is a circuit diagram showing another example of the limiter circuit.

FIG. 6 is a circuit diagram showing another example of the limiter circuit.

In this limiter circuit 8a, the limiter signal is inputted from the upper/lower limit value determining unit 18 in the microcomputer 22 to an inverting input terminal of an OP-amp 107 via a resistance 106. A constant voltage of 2.5 V is applied to a non-inverting input terminal of the OP-amp 107 and the OP-amp 107 is subjected to negative feedback via a resistance 108. The circuit essentially comprising the OP-amp 107 is an inverting amplifying circuit with an inversion voltage of 2.5 V. An output of the inverting amplifying circuit is inputted to an inverting input terminal of an OP-amp 104 and to an inverting input terminal of an OP-amp 110 via a resistance 109.

To a non-inverting input terminal of the OP-amp 110 is applied a constant voltage of 2.5 V, and an output terminal thereof is connected to an anode of a diode 113. A cathode of the diode 113 is connected to the inverting input terminal of the OP-amp 110 via a resistance 112. The inverting input terminal is connected to an anode of a diode 111, and the output terminal is connected to a cathode of the diode 111.

An output terminal of the OP-amp 104 is connected to a base of an NPN-transistor 105 whose emitter is grounded, and whose collector is connected to a non-inverting input terminal of the OP-amp 104.

The cathode of the diode 113 and the collector of the NPN-transistor 105 are connected to the output terminal of the OP-amp 88 via the resistance 90.

In the limiter circuit 8a, the resistances 106 and 108 are set so that the output voltage of the OP-amp 107 is 4 V when the limiter signal from the upper/lower limit value determining unit 18 in the microcomputer 22 is, for example, 0 V. The resistances 109 and 112 are set to have an equal value.

In this state of setting, when an output signal of the addition circuit 7, that is, an input signal of the limiter circuit 8a, $V_2$ is 0 V, the OP-amp 110 outputs a positive voltage since the inverting input terminal of the OP-amp 110 is predominantly inclined to be decreased to a lower voltage than the voltage of 2.5 V due to the virtual short. As a result, the diode 113 is turned on and the diode 111 is turned off. Here the transistor 105 is in the off state. Since the voltage drop in the resistances 109 and 112 is equal (1.5 V), an output signal $V_3$ of the limiter circuit 8a is kept at 1 V.

When the input signal $V_2$ is not lower than 4 V, for example, 5 V, the OP-amp 104 outputs a positive voltage, and the transistor 105 is turned on, whereby the output signal $V_3$ is kept at 4.0 V. Here the diode 113 is turned off, and the diode 111 is turned on.

When the input signal $V_2$ of the addition circuit 7 is 3 V, the transistor 105 is turned off, the diode 113 is turned off, and the diode 111 is turned on. The output signal $V_3$ becomes a value slightly smaller than 3 V because of the divided voltage obtained by dividing the difference, i.e., 0.5 V between the voltage of 2.5 V of the inverting input terminal of the OP-amp 110 and the input signal $V_2$ of 3 V through the resistances 112, 90.

Figure 7:
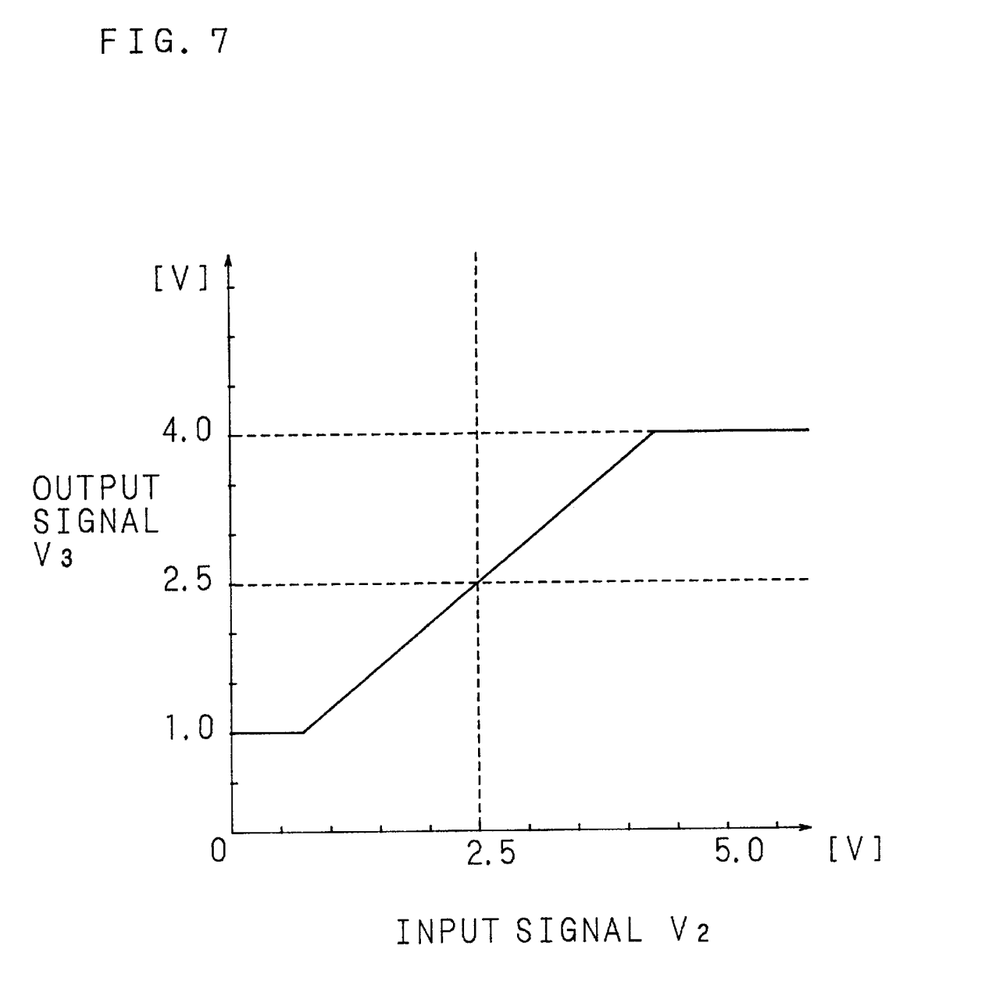
FIG. 7 is a characteristic diagram of the limiter circuit of FIG. 6.

As described above, the output signal $V_3$ of the limiter circuit 8a has a characteristic showing a slightly gentle inclination due to the resistance 90 to the output signal of the addition circuit 7, that is, the input signal of the limiter circuit 8a, $V_2$, as shown in FIG. 7. The upper/lower limit values can be set to be 4.0 V and 1.0 V spaced equally from 2.5 V as a center value.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:

a steering force assisting motor;

a motor driving circuit for driving said motor;

a detecting circuit for detecting a motor current in said motor driving circuit;

a torque sensor for detecting a steering torque and outputting a torque detection signal;

a broken-line function circuit for outputting a predetermined analog broken-line function signal on the basis of said torque detection signal;

a gain circuit for providing a gain to said broken-line function signal;

a polarity inverting circuit for inverting the polarity of said broken-line function signal;

a first attenuating means for attenuating said torque detection signal at a predetermined rate;

a second attenuating means for attenuating an output signal of said polarity inverting circuit at a predetermined rate;

an addition circuit for adding a signal from said first attenuating means, a signal from said second attenuating means and an output signal of said gain circuit, and outputting the addition value as a target value of said motor current; and a differential amplifying circuit for calculating a difference between said target value and the motor current detected by said detecting circuit and supplying the difference to said motor driving circuit for the purpose of feedback control.

2. An electric power steering apparatus according to claim 1, further comprising a differential circuit for differentiating said torque detection signal and outputting the differentiated signal to said polarity inverting circuit.

3. An electric power steering apparatus according to claim 1, further comprising a gain determining means for determining said gain on the basis of running conditions of a vehicle, wherein said gain circuit provides said gain determined by said gain determining means to said broken-line function signal.

4. An electric power steering apparatus according to claim 2, further comprising a gain determining means for determining said gain on the basis of running conditions of a vehicle, wherein said gain circuit provides said gain determined by said gain determining means to said broken-line function signal.

5. An electric power steering apparatus according to claim 1, further comprising:

an upper/lower limit value determining means for determining upper/lower limit values of said target value on the basis of running conditions of a vehicle; and a limiter circuit for limiting said target value by said upper/lower limit values.

6. An electric power steering apparatus according to claim 2, further comprising:

an upper/lower limit value determining means for determining upper/lower limit values of said target value on the basis of running conditions of a vehicle; and a limiter circuit for limiting said target value by said upper/lower limit values.

7. An electric power steering apparatus according to claim 3, further comprising:

an upper/lower limit value determining means for determining upper/lower limit values of said target value on the basis of running conditions of the vehicle; and a limiter circuit for limiting said target value by said upper/lower limit values.

8. An electric power steering apparatus according to claim 4, further comprising:

an upper/lower limit value determining means for determining upper/lower limit values of said target value on the basis of running conditions of the vehicle; and a limiter circuit for limiting said target value by said upper/lower limit values.

* * * * *